United States Patent
Marek et al.

(10) Patent No.: US 7,032,294 B2
(45) Date of Patent: *Apr. 25, 2006

(54) METHOD OF MAKING SWITCHABLE SHUNTS FOR INTEGRATED LEAD SUSPENSIONS

(75) Inventors: Stevenson J. Marek, Hutchinson, MN (US); Craig A. Leabch, Saint Cloud, MN (US); Larry C. Webb, Jr., Hutchinson, MN (US); Mark A. Miller, Hutchinson, MN (US); Anthony J. Liberko, Hutchinson, MN (US); Raymond R. Wolter, Hutchinson, MN (US); Steven R. Lagergren, Litchfield, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 350 days.

This patent is subject to a terminal disclaimer.

(21) Appl. No.: 10/349,050

(22) Filed: Jan. 22, 2003

(65) Prior Publication Data

US 2003/0106784 A1 Jun. 12, 2003

Related U.S. Application Data

(62) Division of application No. 09/652,958, filed on Aug. 31, 2000, now Pat. No. 6,518,521.

(60) Provisional application No. 60/152,175, filed on Sep. 2, 1999.

(51) Int. Cl.
*G11B 5/127* (2006.01)
*H04R 31/00* (2006.01)

(52) U.S. Cl. .............................. 29/603.03; 29/603.04; 29/603.06; 29/622; 29/852; 29/854; 200/16 D; 200/181; 200/250; 200/283; 216/22; 216/41; 360/245; 360/245.8; 360/245.9

(58) Field of Classification Search ............................... 29/603.03–603.06, 605, 622, 852, 854; 200/16 D, 200/181, 250, 283; 216/22, 41; 360/245, 360/245.8, 245.9
See application file for complete search history.

(56) References Cited

U.S. PATENT DOCUMENTS 6,275,361 B1 8/2001 Wallash et al. .............. 360/323

*Primary Examiner*—David P. Bryant
*Assistant Examiner*—Paul Kim
(74) *Attorney, Agent, or Firm*—Faegre & Benson LLP

(57) ABSTRACT

A switchable shunt has an insulating layer separating conductive lead and spring metal layers. The shunt includes a base region formed on the spring metal layer, one or more arms formed in the conductive lead layer and at least one of the insulating and spring metal layers, one or more pad regions electrically coupled to an arm and formed in at least the conductive lead layer, and one or more gaps. Each arm extends through a gap and is resiliently biased toward a shunted state with the pad region in electrical contact with the base region. The shunt is movable to an electrically open state where the pad and base regions are electrically isolated. A method of making the shunt includes etching the shunt from laminated material and pushing the arm and pad through the gap. The shunt may be operated by applying a force to the arm.

33 Claims, 10 Drawing Sheets

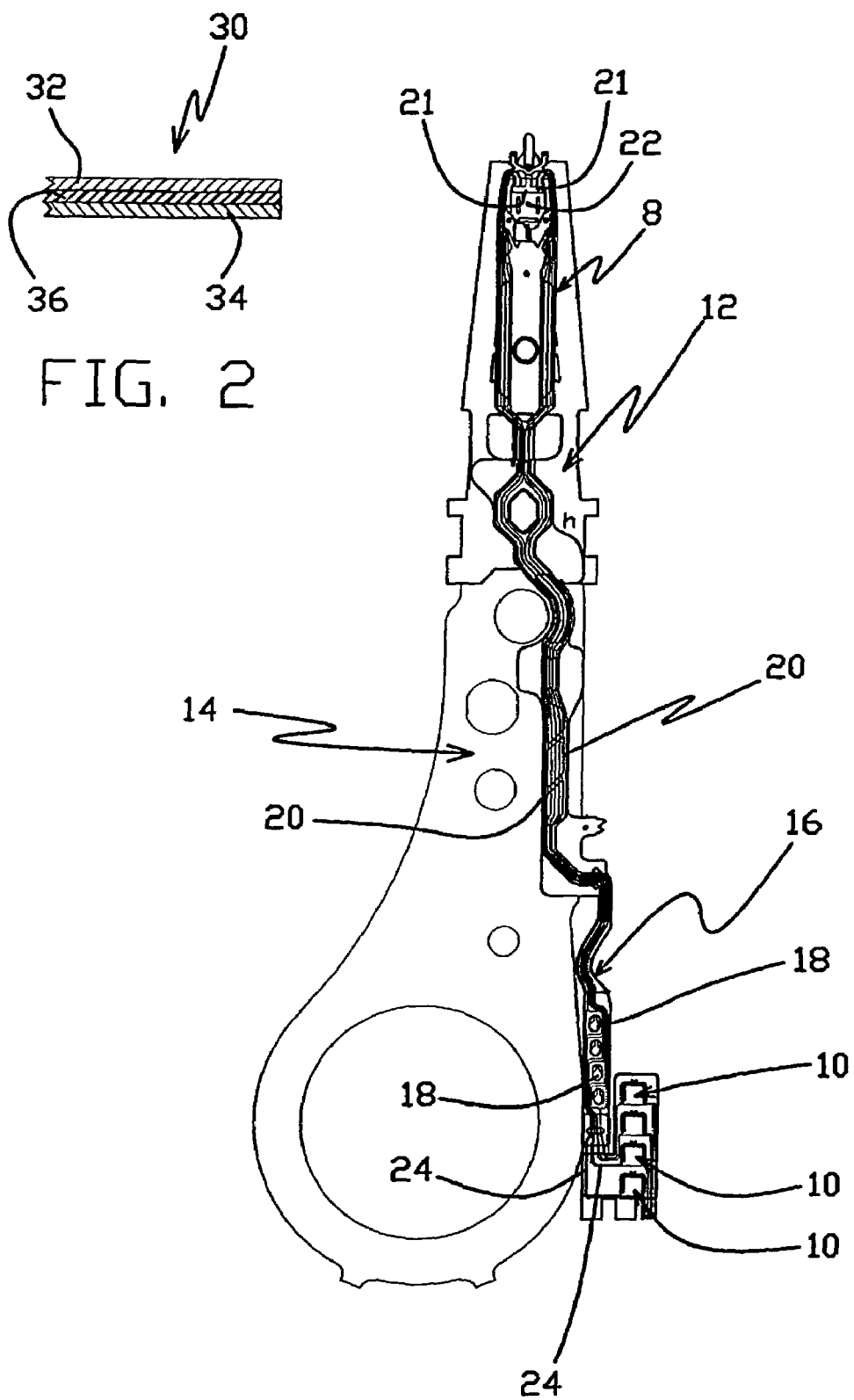

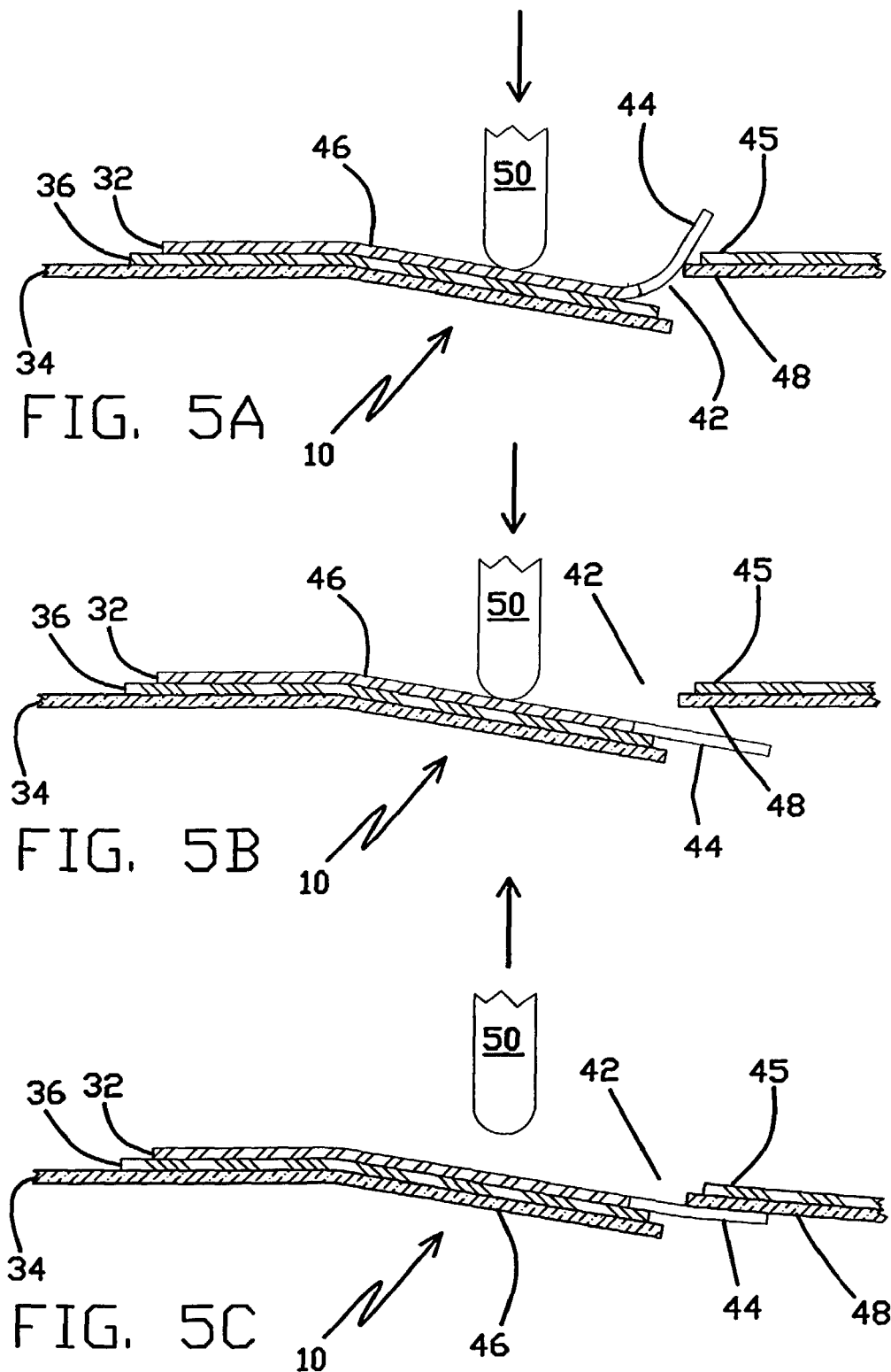

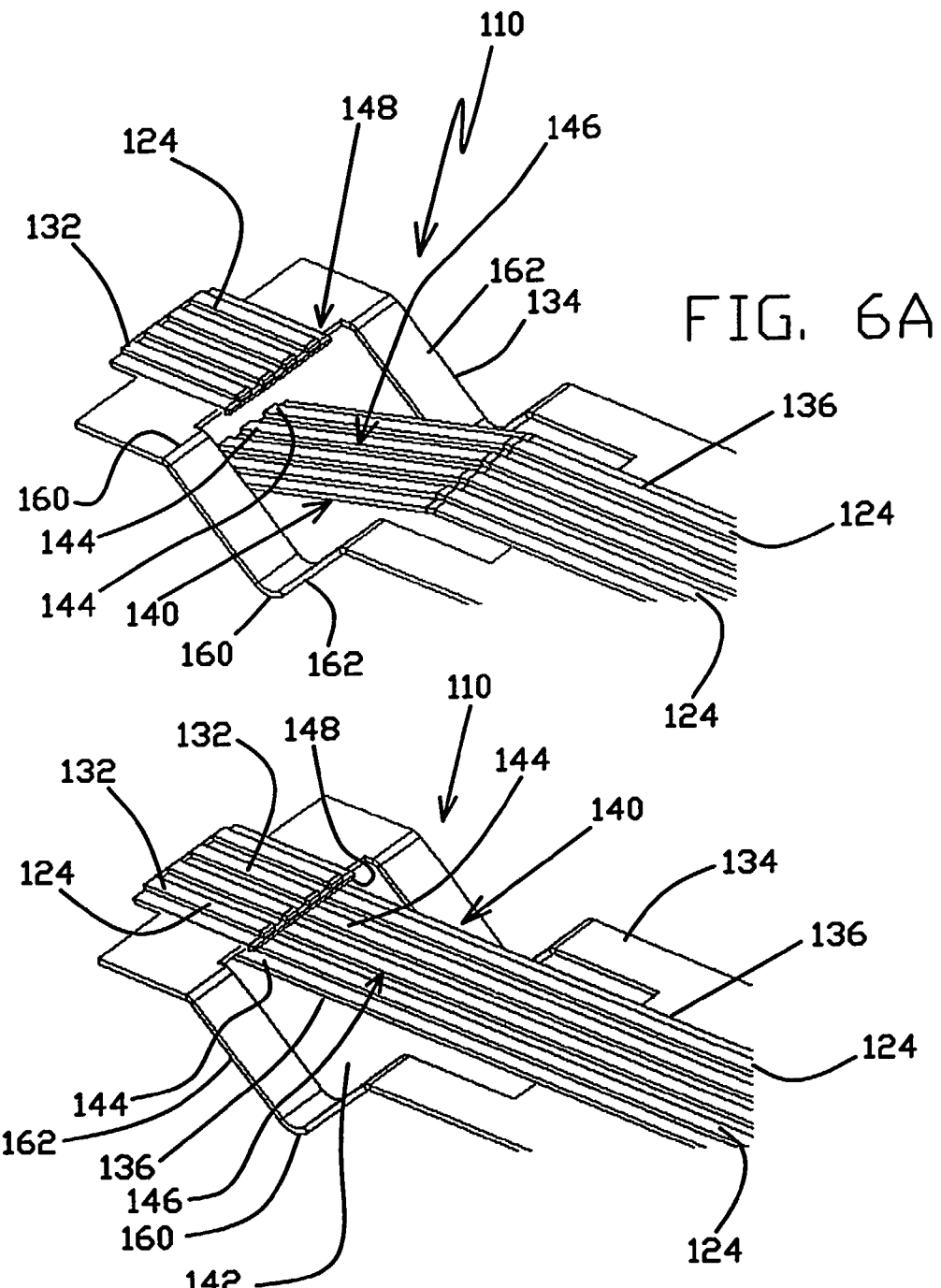

METHOD OF MAKING SWITCHABLE SHUNTS FOR INTEGRATED LEAD SUSPENSIONS

CROSS-REFERENCE TO RELATED APPLICATION

This application is division of Ser. No. 09/652,958, filed Aug. 31, 2000, now U.S. Pat. No. 6,518,521 which claims benefit of 60/152,175, filed Sep. 2, 1999.

FIELD OF THE INVENTION

The present invention relates generally to electrical shunts in integrated lead suspensions.

BACKGROUND OF THE INVENTION

Integrated lead suspensions and components (such as flexures) for supporting read and/or write heads in disk drives are well known and in widespread use. So-called "subtractive" type integrated lead suspensions and associated methods for manufacturing the suspensions from laminated sheets of material are disclosed, for example, in the Bennin et al. U.S. Pat. Nos. 5,598,307 and 5,844,751.

Magneto restrictive (MR) and giant magneto restrictive (GMR) heads are commonly mounted to the suspensions. Heads of these types are very sensitive to damage due to "blown fuse" syndrome and electrostatic discharges (ESD). To minimize this damage, the leads of the heads themselves and/or the integrated leads on the suspensions can be electrically shunted (i.e., interconnected or shorted) during manufacturing operations. The stainless steel (i.e., spring metal) layer of the suspension or flexure also is sometimes electrically interconnected to one of the integrated leads to couple the stainless steel layer to ground potential.

It is sometimes necessary to conduct tests of the integrated leads and/or the heads. Any shunts on the leads must typically be removed before the tests can be performed. The leads and heads must be reshunted following the tests if it is again desired to protect the heads from damage. A number of approaches for shunting and reshunting MR and GMR heads, or otherwise electrically coupling the leads to the stainless steel layer during the various stages of the head suspension assembly manufacturing operations are known and disclosed, for example, in the following references.

| Inventor | Document No. |
|---|---|
| Bajorek et at. | U.S. Pat. No. 5,465,186 |
| Arya et al. | U.S. Pat. No. 5,710,682 |
| Johansen et al. | U.S. Pat. No. 5,877,933 |
| Kanda | U.S. Pat. No. 5,991,121 |
| Zarouri et al. | U.S. Pat. No. 6,034,851 |
| Albrecht et al. | U.S. Pat. No. 6,052,258 |
| Hiraoka et al. | U.S. Pat. No. 6,075,676 |
| Yim et at. | U.K. 2,343,304 |

There remains a continuing need for improved shunts. To be commercially viable, the shunts should be efficient to manufacture and use. Shunts which can be conveniently reused would be especially desirable.

SUMMARY OF THE INVENTION

In one aspect, the present invention includes a method for manufacturing a switchable shunt for an integrated lead suspension of component by etching the shunt from a laminated sheet of material having a conductive lead layer and a spring metal layer separated by an insulating layer. The method includes forming a contact base region on a portion of the spring metal layer, forming a contact arm having a contact pad region electrically connected to at least one of the integrated leads, and resiliently biasing the contact arm toward a shunted state at which the contact pad region is in electrical contact with the contact base region, and movable from the shunted state to an electrically open state at which the contact pad region is electrically isolated from the contact base region.

In another aspect, the present invention includes a method for manufacturing a switchable shunt for an integrated lead suspension or component from a laminated sheet of material including a conductive lead layer and a spring metal layer separated by an insulating layer, where the method includes forming a contact base region on a portion of the spring metal layer, forming one or more contact arms, each contact arm electrically coupled to an integrated lead and formed in the conductive lead layer and at least one of the insulating layer and spring metal layer, forming one or more contact pad regions, each contact pad region electrically coupled to a contact arm and formed in at least the conductive lead layer, forming one or more gaps, each gap surrounding portions of one or more contact arms and associated contact pad regions extending each contact arm through the gap, and resiliently biasing each contact arm toward a shunted state at which the contact pad region is in electrical contact with the contact base region, and movable from the shunted state to an electrically open state at which the contact pad region is electrically isolated from the contact base region.

BRIEF DESCRIPTION OF THE DRAWINGS

FIG. 1 is a top view of a disk drive head suspension with an integrated lead flexure having a switchable shunt in accordance with a first embodiment of the present invention.

FIG. 2 is a side view of a portion of a laminated sheet of material from which the shunt shown in FIG. 1 can be manufactured.

FIGS. 5A–5C are sectional side views of the shunt shown in FIG. 4 as it is driven from its pre-activated to its activated state.

FIG. 6A is an isometric view of a shunt in accordance with a second embodiment of the present invention in its electrically open state.

FIG. 6B is an isometric view of the shunt shown in FIG. 6A in its shunted state.

DETAILED DESCRIPTION OF THE PREFERRED EMBODIMENTS

Figure 3:
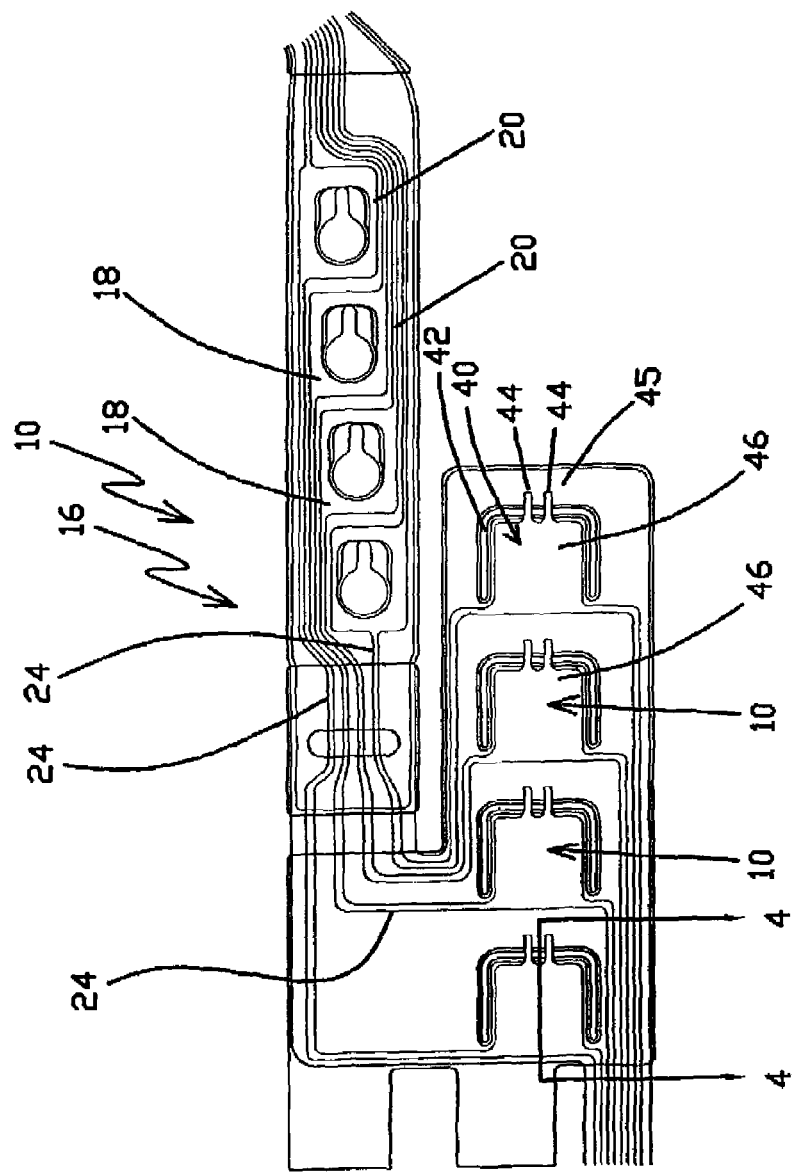
FIG. 3 is a detailed view of the proximal section of the flexure tail shown in FIG. 1, illustrating the terminal pads and shunts.

A suspension flexure 8 (i.e., a suspension component) which includes a plurality of switchable shunts 10 in accordance with a first embodiment of the present invention is illustrated in FIG. 1. In the embodiment shown, the flexure 8 is an integrated lead-type component which is manufactured as a separate unit and mounted to a load beam 12. The load beam 12 is shown mounted to an actuator arm 14.

Shunts 10 are located on a tail 16 at the proximal end of the flexure 8. Also located on the tail 16 are terminal pads 18. Each terminal pad 18 is connected to an integrated lead section 20 which extends from the terminal pad to head terminals 21 at a head slider mounting region 22 on a distal end of the flexure 8. Although not shown, head sliders having magneto restrictive (MR) or other heads will be mounted to the slider mounting region 22 and electrically connected to the head terminals 21. Each of the shunts 10 is electrically connected to one of the terminal pads 18 by an integrated lead section 24.

FIG. 2 is a cross sectional view of a portion of a laminated sheet of material 30 from which the flexure 8 and shunts 10 can be manufactured. The sheet of material 30 includes a copper or copper alloy layer 32 (i.e., a conductor layer) and a stainless steel layer 34 (i.e., a spring metal layer) separated by a polyimide layer 36 (i.e., an insulator layer). As described in greater detail below, certain electrical signal-conducting features of the flexure 8 and shunts 10, including the integrated leads 20 and 24, are formed in the copper alloy layer 32. Certain structural features of the flexure 8 and shunts 10, including the head slider mounting region 22 and a base of the shunts, are formed in the stainless steel layer 34. Polyimide layer 36 is formed into sections which electrically isolate signal-conducting features in the copper alloy layer 32 from each other and from the stainless steel layer 34. Conventional or otherwise known photolithographic and etching techniques can be used to form the flexure 8 and shunts 10 from laminated sheets of material 30.

FIG. 3 is a detailed illustration of the proximal section of the flexure tail 16 at which the terminal pads 18 and shunts 10 are located. As shown, each of the terminal pads 18 is connected to one of the lead sections 20. Similarly, each of the shunts 10 is connected to an associated terminal pad 18 by a lead section 24. The shunts 10 are shown in their pre-activated state in FIG. 3.

Figure 4:
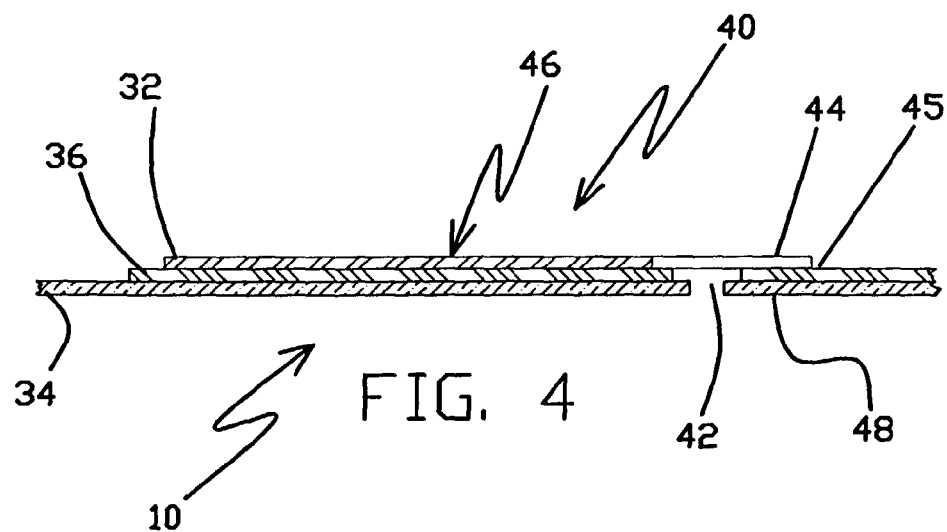
FIG. 4 is a sectional side view of a shunt in its pre-activated state, taken along lines 4—4 in FIG. 3.

FIG. 4 is a detailed sectional view of a portion of one of the shunts 10 in its pre-activated state. As shown, the shunt 10 includes a contact arm 40, contact pads 44 and contact base 48. Contact arm 40 extends into a gap 42 and is electrically connected to an associated lead section 24. The contact arm 40 includes an enlarged test pad 46 in the embodiment shown. The upper or first surface of the contact arm 40, contact pad 44 and test pad 46 are all formed as unitary or integral features from the copper alloy layer 32 of a laminated sheet of material such as 30. In the embodiment shown, the contact arm 40 and test pad 46 also include features formed from the polyimide layer 36 and stainless steel layer 34. Other embodiments have a contact arm 40 and test pad 46 having features formed from only the copper alloy layer 32, or formed from the copper alloy layer and polyimide layer 36, but not the stainless steel layer 34. Generally, whether the contact arm 40 or test pad 46 include features formed from the polyimide layer 36 and/or the stainless steel layer 34 will depend upon factors such as whether the amount of bias force created by the features in the other layers (e.g., the copper alloy layer 32) is sufficient to enable the shunt 10 to operate in the manner described below.

Contact pads 44 extend from an end of the arm 40 across the gap 42. The contact pads 44 in the embodiment shown in FIGS. 3 and 4 include features formed from only the copper alloy layer 32. Other embodiments of the contact pads 44 (not shown) also include features formed from the polyimide layer 36 and/or the stainless steel layer 34. A pad support portion 45 of the flexure tail 16 over which the contact pads 44 lay when the shunt 10 is in the pre-activated state shown in FIGS. 3 and 4, (i.e., the area opposite the gap 42 from the contact arm 40 and under the contact pads) has the copper alloy layer 32 removed (or conductor otherwise not present) to electrically isolate the contact pads from electrical features other than the associated contact arm and lead section 24. Although the contact pads 44 are shown as a pair of elongated elements in the embodiments illustrated in FIGS. 3 and 4, the one or more than two contact pads can be incorporated onto each shunt 10. Similarly, the contact pads 44 can be formed as different shapes.

Contact base 48 is located on the stainless steel layer 34 on the side opposite from the location of the contact pads 44 when the contact pads are in the pre-activated state. The contact base 48 is effectively located on a second or lower side of the shunt 10.

The operation of switchable shunts 10 can be described with reference to FIGS. 4 and 5A–5C. When in the pre-activated state shown in FIG. 4, the contact pad is electrically isolated from all electrical components of the flexure 8 and load beam 12 other than the associated lead sections 20 and 24, terminal pad 18 and head terminal 21. The shunt 10 is activated by forcing the contact arm 40 (e.g., by a tool 50) through the gap 42 toward the lower side (i.e., the side with the stainless steel layer 34). The activation force is applied to bend the contact arm 40 within its range of elastic deformation (i.e., against the bias force created by the material layers 32, 36 and 34). As shown in FIG. 5A, this activation motion causes the contact pads 44 to bend from their generally linear state (e.g., within their range of elastic deformation) and move through the gap 42. With continued activation motion the contact pads 44 will pass completely through the gap 42 and resiliently return (at least partially) to their linear state as shown in FIG. 5B. After the contact pads 44 have passed completely through the gap 42, the activation force is removed (e.g., by retracting the tool 50), thereby allowing the bias force of the contact arm 40 to return the arm toward its pre-activated state. This return motion will stop when the shunt is in the shunted state shown in FIG. 5C with the contact pads 44 engaged with the contact base 48. When the shunt 10 is in the shunted state shown in FIG. 5C, the associated lead sections 20 and 24, terminal pad 18 and head terminal 21 of the shunt are electrically interconnected to the stainless steel layer 34 of the flexure 8. A head (not shown) mounted to the flexure 8 is thereby effectively grounded to the load beam 12.

When it is desired to perform an electrical test on the integrated lead flexure 10 (e.g., lead sections 20 and 24, terminal pad 18 and/or head terminal 21) or a head (not shown) mounted thereto, a probe can be engaged with the test pad 46 to bend the contact arm 40 within its range of elastic deformation in the direction of the lower surface to force the shunt 10 into its electrically open state with the contact pads 44 disengaged from the contact base 48 (e.g., as shown in FIG. 5B). The electrical test system probe (not shown) can be manipulated to move the shunt to the electrically open state while the electrical test is being performed. When the electrical test is completed, the shunt 10 is returned to its shunted state (shown in FIG. 5C) by removing the force applied to the test pad 46 by the probe.

Shunt 110, a second embodiment of the invention, is illustrated in FIGS. 6A and 6B. Shunt 110 is similar in many respects to shunt 10 described above, and similar features are identified by corresponding reference numbers. The shunt 110 is shown in its electrically open state in FIG. 6A, and in its shunted state in FIG. 6B. Shunt 110 has only one contact arm 140 on which a plurality of leads 124 and associated contact pads 144 are located. No stainless steel layer 134 is present on the contact arm 140 in the embodiment shown. The overlap between the contact pads 144 on the contact arm 140 and the contact base 148 is caused by bends 160 in the side arms 162 in the stainless steel layer 134. The bends 160 effectively shorten the distance between the contact arm 140 and the contact base 148. Through the actuation of the one contact arm 140, all the leads 124 can be effectively simultaneously switched between their shunted and electrically open states.

Figure 7A:
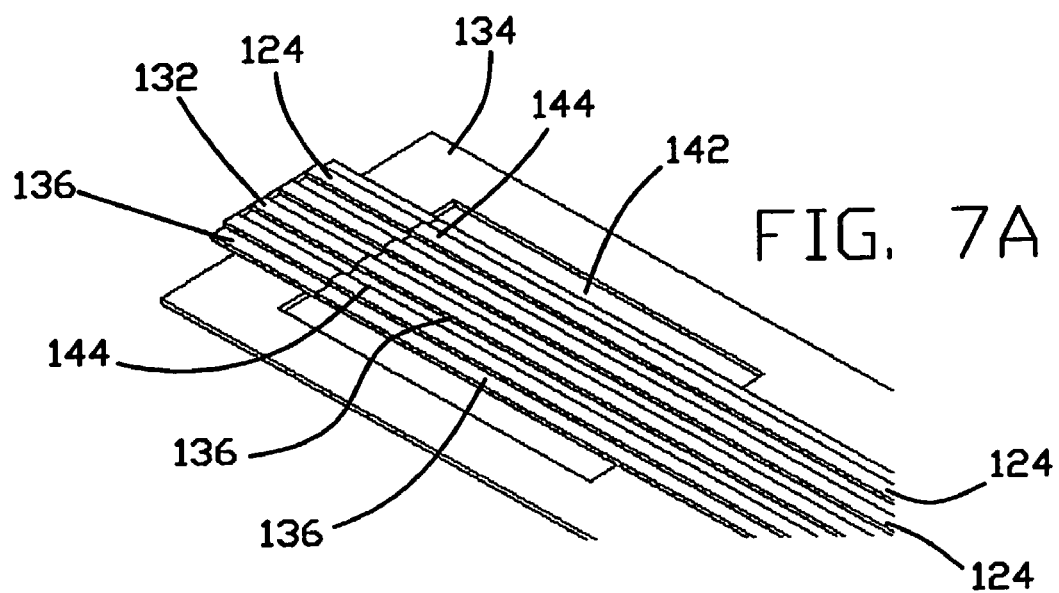
FIGS. 7A and 7B illustrate a method by which the shunt shown in FIGS. 6A and 6B can be fabricated.
Figure 7B:
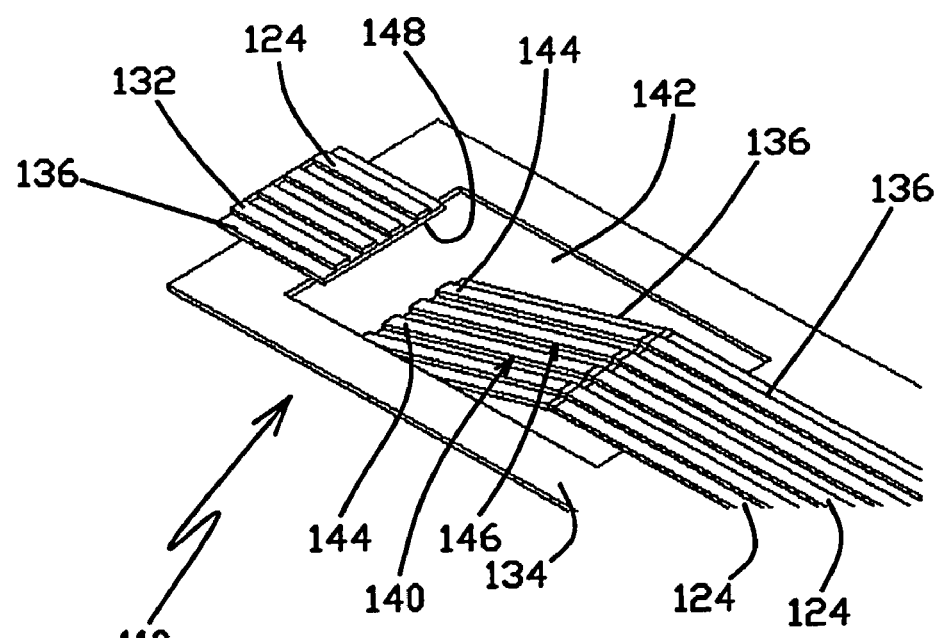

FIGS. 7A and 7B illustrate several steps in the process by which the shunt 110 can be fabricated. As shown in FIG. 7A, following the formation of the gap 142, the contact arm is formed by severing the adjacent sections of the leads 124 at a location adjacent to the contact pads 144. When the contact arm 146 is forced downwardly against the bias force provided by the insulating layer 136 and copper alloy layer 132 as shown in FIG. 7B, the bends 160 can be formed in the arms 162.

Figure 8:
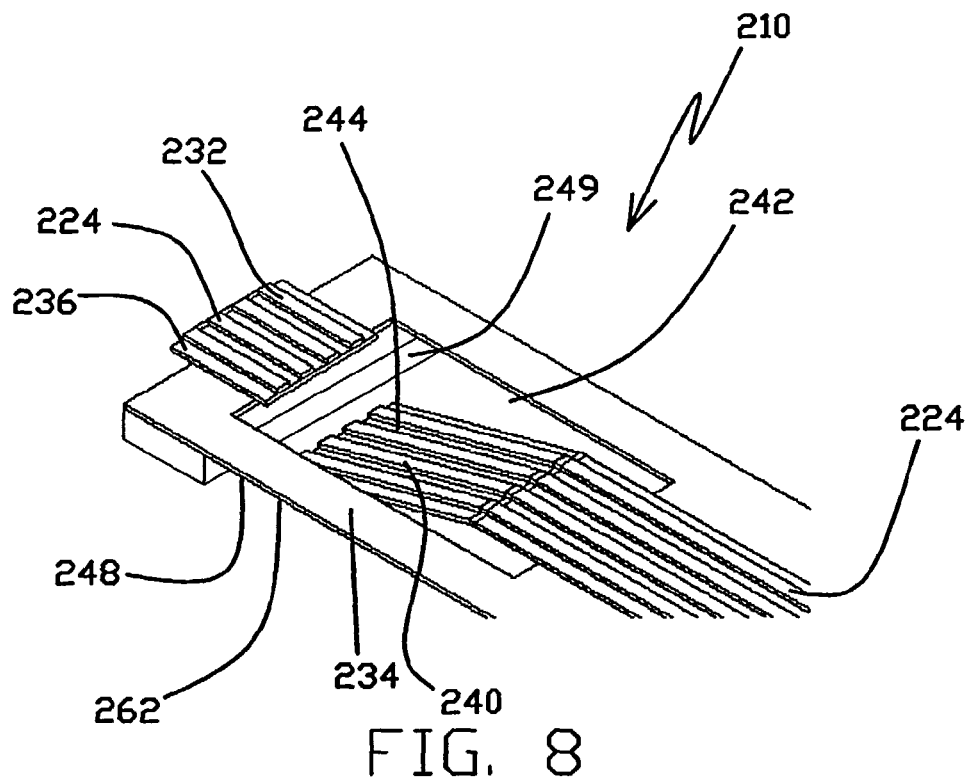
FIG. 8 is an isometric view of a shunt in accordance with a third embodiment of the present invention.

Shunt 210, a third embodiment of the present invention, is illustrated in FIG. 8. Shunt 210 is similar to shunt 110 described above, and similar features are identified with similar reference numbers. As shown, the contact base 248 includes a section 249 of added conductive material to function as a common ground. Conductive material section 249 can be an extension from the base load beam material, carrier strip or a separate component. Shunt 210 offers many of the advantages of shunt 110, but does not require the vertical space needed for the bent side arms 162 of the shunt 110.

Figure 9C:
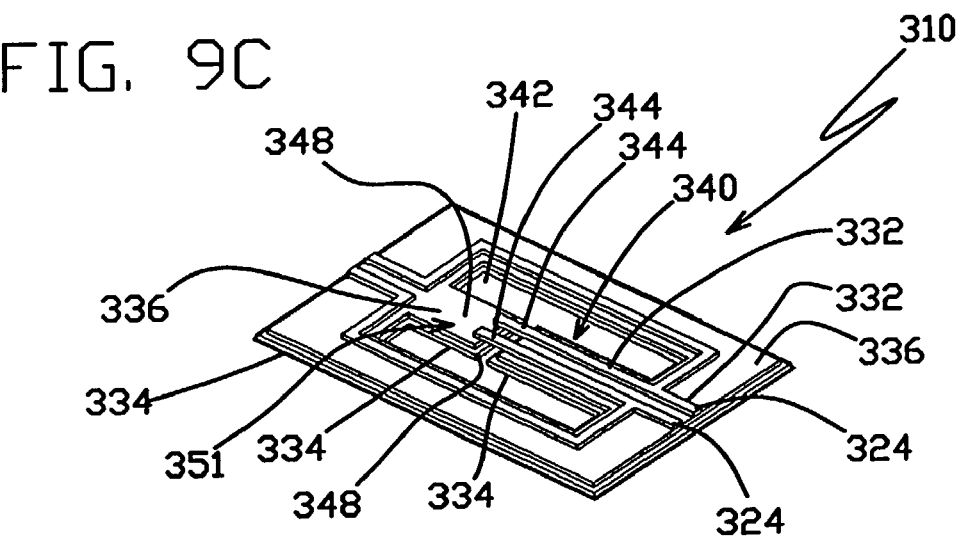
FIG. 9C is an illustration of the shunt shown in FIG. 9A in its pre-activated state.
Figure 9B:
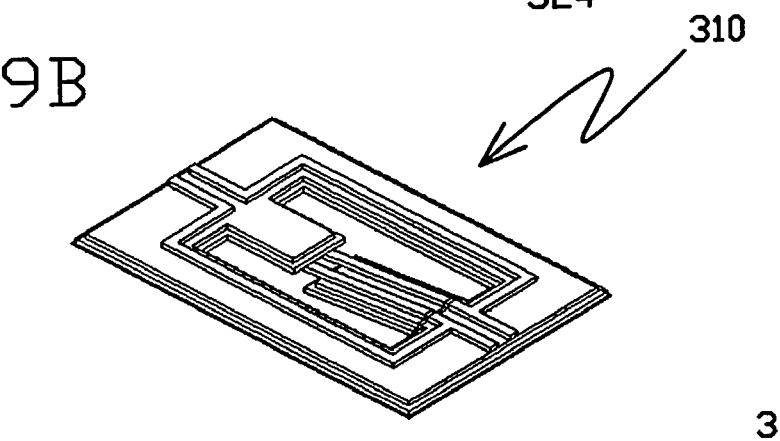
FIG. 9B is an illustration of the shunt shown in FIG. 9A in its shunted state.
Figure 9A:
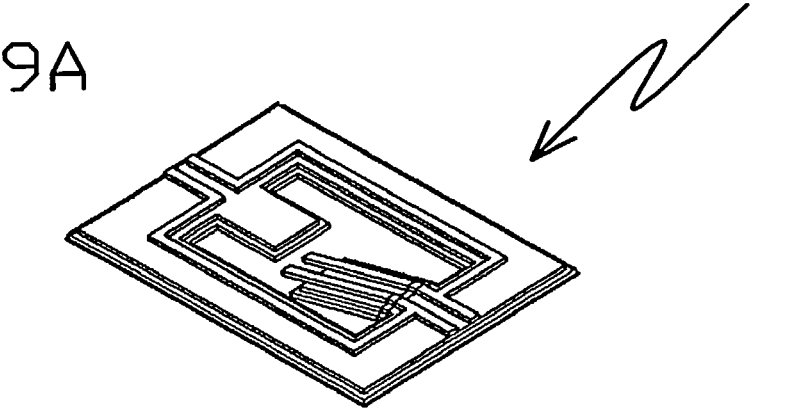
FIG. 9A is an isometric view of a shunt in accordance with a fourth embodiment of the present invention in its electrically open state.

Shunt 310, a fourth embodiment of the present invention, is illustrated in FIGS. 9A–9C. Shunt 310 is similar to shunt 10 described above, and similar features are identified with similar reference numbers. As shown, the contact base 348 is located on a tab 351 which extends into the gap 342 from a location opposite the contact arm 340. The shunt 310 is shown in its electrically open state in FIG. 9A, in its shunted state in FIG. 9B, and in its pre-activated state in FIG. 9C.

Figure 10:
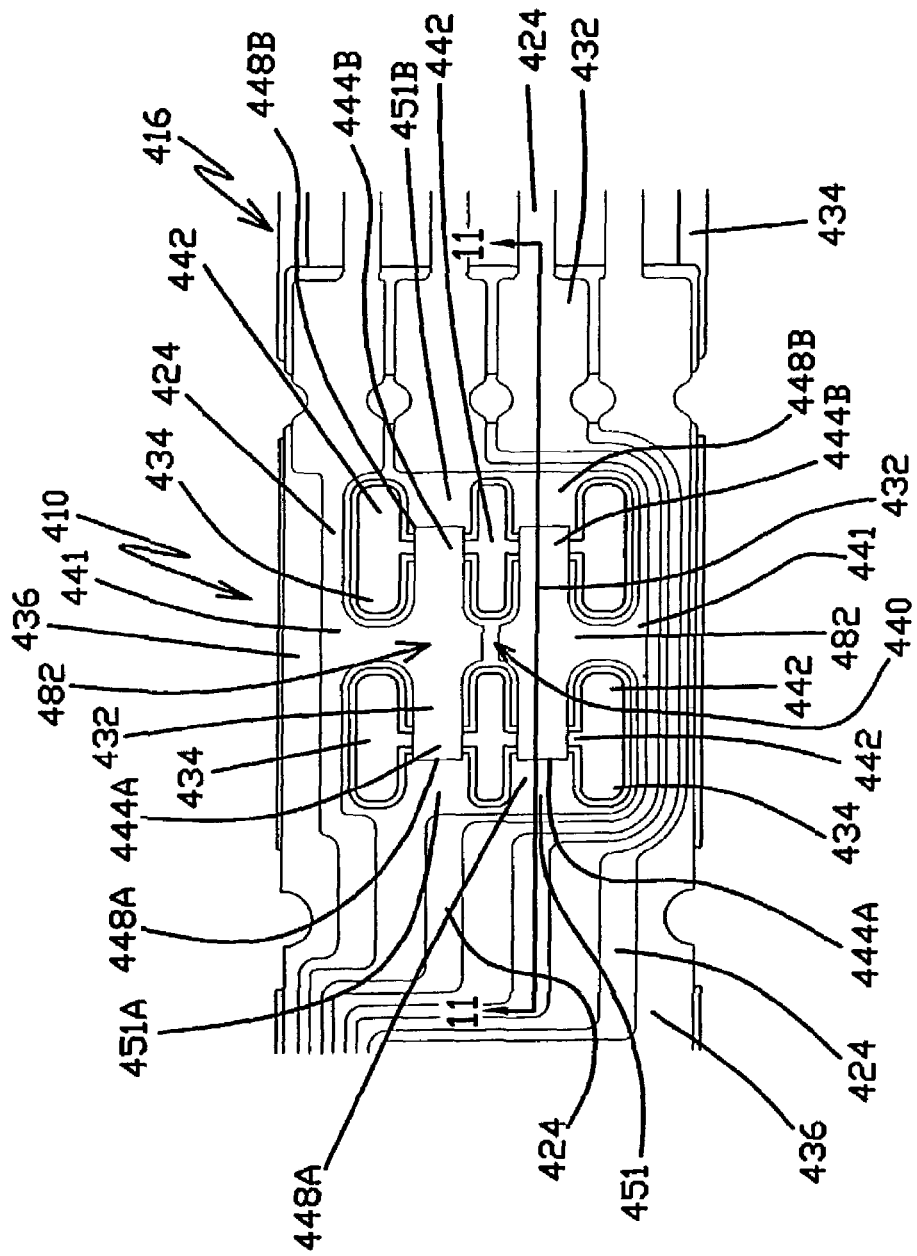
FIG. 10 is a top view of a shunt in accordance with a fifth embodiment of the present invention in its pre-activated state.

Shunt 410, a fifth embodiment of the present invention, is illustrated in FIG. 10. Features of shunt 410 which are structurally and/or functionally similar to those of shunt 10 described above are identified with similar reference numbers. The shunt 410 is shown in its pre-activated state in FIG. 10. As shown, the shunt 410 includes a contact arm 440 having two shunt elements 482. Unlike the contact arm 40 of shunt 10 described above, arm 440 is connected to the flexure tail 416 at both ends and is not a cantilever structure. Each of the shunt elements 482 performs a shunting function for one associated lead 424, and is T-shaped with a pair of opposed contact pads 444A and 444B extending from a central connection 441 which couples the contact pads to the associated lead. Shunt 410 also includes a pair of contact bases 448A and 448B associated with the contact pads 444A and 444B, respectively. As shown, the contact bases 448A and 448B are located on tabs 451A and 451B which extend into the gaps 442 toward the associated contact bases 448A and 448B, respectively.

Figure 11A:
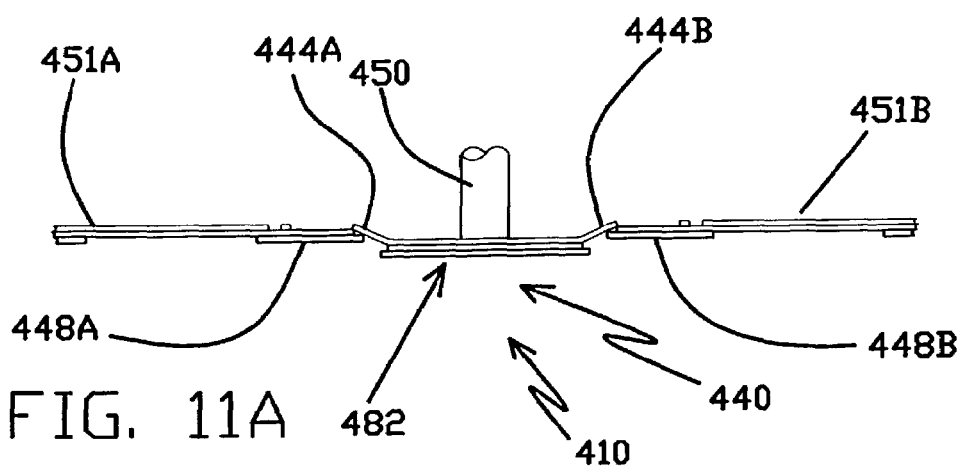
FIGS. 11A–11D are detailed cross sectional illustrations of the shunt shown in FIG. 10 as it is driven from its pre-activated to its activated state.
Figure 11B:
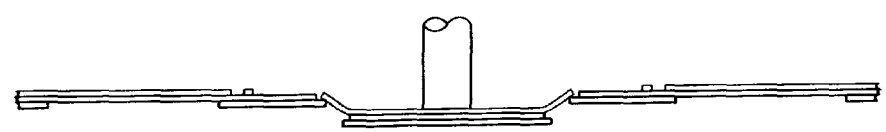
Figure 11C:
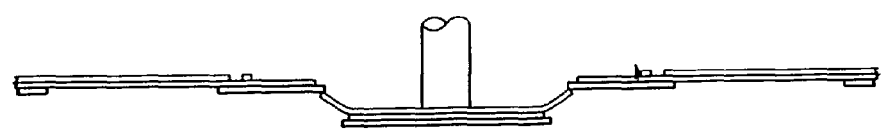
Figure 11D:
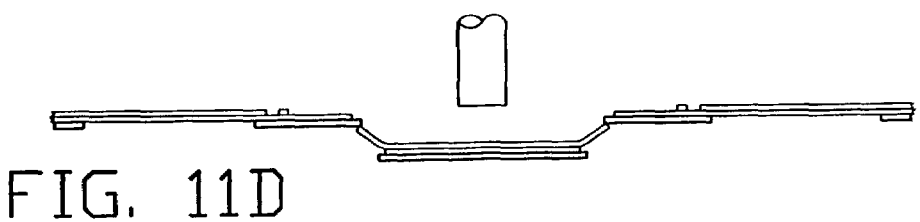
Figure 12:
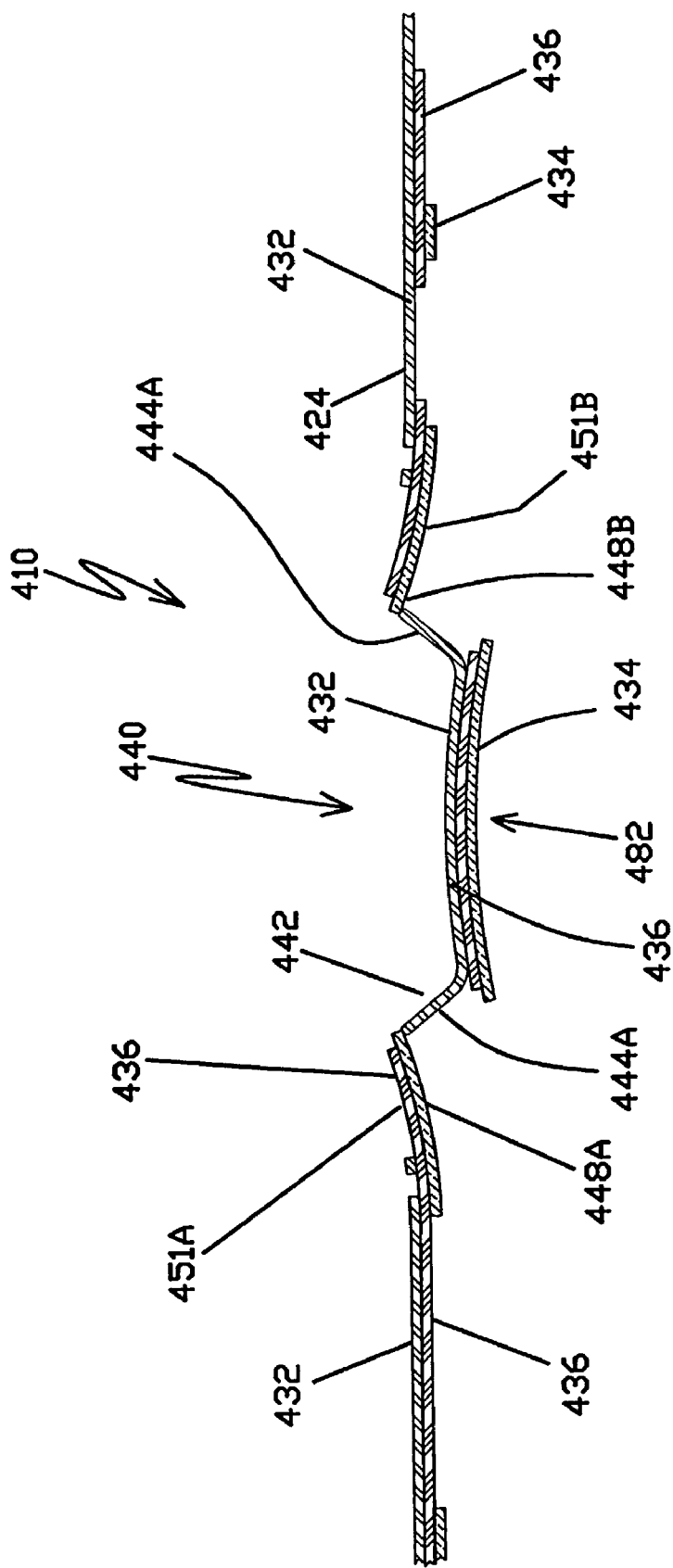
FIG. 12 is a detailed side view of the shunt shown in FIG. 10 in its shunted state.

FIGS. 11A–11D illustrate the activation of shunt 410 through the use of tool 450. As shown, when the tool 450 engages and forces the contact arm 440 toward its activated state, both contact pads 444A and 444B of both shunt elements 482 pass through the gap 442. When activated, the contact pads 444A and 444B are bent through a range of plastic deformation and are permanently bent toward the contact bases 448A and 448B, respectively. However, motion of the contact pads 444A and 444B in the range of elastic deformation causes the contact pads to extend under the contact bases 448A and 448B, respectively, when the force on the contact arm 440 is removed. FIGS. 11D and 12 illustrate the engagement of contact pads 444A and 444B with the contact bases 448A and 448B when the shunt 410 is in its shunted state. Both leads 424 which are shunted by shunt 410 can be switched between their shunted and electrically open states by the actuation of the contact arm 440. An advantage of shunt 410 is the minimization of the bending or bowing of the flexure tail 416 when the shunt is in its shunted state as a result of the balancing of the forces caused by the engagement of the contact pads 444A and 444B with the contact bases 448A and 448B, respectively.

The switchable shunts described above offer important advantages. They are effectively and conveniently switchable, allowing tests to be performed on the suspension or heads and the suspension or heads subsequently reshunted. Probes of test instruments can be urged into contact with the test pads, and at the same time move the shunt to its open state to permit the test to be performed. In effect, the deshunting step is performed automatically when the test instrument probe is applied. When the instrument probe is withdrawn, the shunt is returned to its shunted state. In the shunted state the shunt has low resistance. The shunt can be formed in a laminated structure-type suspension or component using conventional manufacturing processes (i.e., etching) without additional (i.e., shunt-specific) steps. The shunts can also be formed by so-called "additive" and other processes. They are compact structures which take up little space on the suspension or component. The shunts or portions thereof can be cut from the suspension (detabbed) following completion of manufacturing and test operations to "permanently" deshunt the suspension, without interfering with the terminal pads on the leads.

Although the present invention has been described with reference to preferred embodiments, those skilled in the art will recognize that changes can be made in form and detail without departing from the spirit and scope of the invention.

What is claimed is:

1. A method for manufacturing a switchable shunt for an integrated lead suspension or component by etching the shunt from a laminated sheet of material having a conductive lead layer and a spring metal layer separated by an insulating layer, the method including providing the laminated sheet of material having the conductive lead layer. and the spring metal layer separated by the insulating layer:

forming a contact base on a portion of the spring metal layer;

forming a contact arm having a contact pad region electrically connected to at least one of the integrated leads formed on the integrated lead suspension or component; and resiliently biasing the contact arm toward a shunted state at which the contact pad region is in electrical contact with the contact base, and movable from the shunted state to an electrically open state at which the contact pad region is electrically isolated from the contact base.

2. The method of claim 1 including etching the contact arm and contact pad region in the conductive lead layer.

3. The method of claim 2 including forming the contact arm to include portions of the insulating layer.

4. The method of claim 2 including forming the contact arm and contact pad region to include portions of the insulating layer.

5. The method of claim 2 including forming the contact arm to include portions of the insulating layer and the spring metal layer.

6. The method of claim 2 including forming the contact arm and contact pad region to include portions of the insulating layer and the spring metal layer.

7. The method of claim 1 including
forming a gap through the conductive lead, spring metal and insulating layers; and
extending the contact arm and contact pad region through the gap such that
i) an upper surface of the contact pad region is in electrical contact with a lower surface of the contact base when the shunt is in the shunted state, and
ii) the upper surface of the contact pad region faces is adjacent to but electrically isolated from the lower surface of the contact base when the shunt is in the electrically open state.

8. The method of claim 1 including forming a test pad on the contact arm.

9. The method of claim 1 including
forming two electrically interconnected and opposed contact pad regions in the contact arm; and
forming two electrically interconnected and opposed contact bases in the contact base.

10. The method of claim 9 including
forming a gap through the conductive lead, spring metal and insulating layers;
extending the contact arm and opposed contact pad regions across the gap; and
extending a pair of opposed tabs across the gap, wherein the two contact bases are located on the tabs.

11. The method of claim 10 including forming the shunt element in a T-shape.

12. The method of claim 11 including forming the contact arm as two T-shaped shunt elements.

13. The method of claim 1 further including pushing the contact arm and contact pad region through a gap to place the shunt in the shunted state.

14. A method for manufacturing a switchable shunt for an integrated lead suspension or component from a laminated sheet of material including a conductive lead layer and a spring metal layer separated by an insulating layer, the method including providing the laminated sheet of material having the conductive lead layer and the spring metal layer separated by the insulating layer:
forming a contact base on a portion of the spring metal layer;
forming one or more contact arms, each contact arm electrically coupled to an integrated lead and formed in the conductive lead layer and at least one of the insulating layer and spring metal layer;
forming one or more contact pad regions, each contact pad region electrically coupled to one of the contact arms and formed in at least the conductive lead layer;
forming one or more gaps, each gap surrounding portions of one or more contact arms and associated contact pad regions;
extending each contact arm through the gap; and
resiliently biasing each contact arm toward a shunted state at which the contact pad region is in electrical contact with the contact base, and movable from the shunted state to an electrically open state at which the contact pad region is electrically isolated from the contact base.

15. The method of claim 14 including forming a test pad on each contact arm.

16. The method of claim 14 including forming each contact pad region from the insulating layer.

17. The method of claim 16 including forming each contact pad region from the spring metal layer.

18. The method of claim 17 further including forming one or more side arms between the contact base and the contact arm such that the contact pads overlap with the contact base.

19. The method of claim 14 including forming a plurality of contact arms on a common portion of the spring metal layer.

20. The method of claim 14 including etching the shunt from the laminated sheet of material.

21. The method of claim 14 further including pushing the contact arm and contact pad region through the respective portion surrounding gap to place the shunt in the shunted state.

22. A method of manufacturing a switchable shunt for an integrated lead suspension or component of the type having a conductive lead layer and a spring metal layer separated by an insulating layer, the method including providing a laminated sheet of material having the conductive lead layer and the spring metal layer separated by the insulating layer:
forming a first contact region on a portion of the spring metal layer;
forming a second contact region electrically connected to at least one of a plurality of integrated leads in the conductive lead layer formed on the integrated lead suspension or component; and
resiliently biasing the first and second contact regions towards each other to form a shunted state in which the first and second contact regions are in electrical contact with each other, and further wherein the first and second contact regions are movable with respect to each other from the shunted state to an electrically open state in which the first contact region is electrically disconnected from the second contact region.

23. The method of claim 22 including etching the shunt from a laminated sheet of material containing the conductive lead layer, the spring metal layer and the insulating layer.

24. The method of claim 23 including pushing the second contact region through a gap to place the shunt in the shunted state.

25. A method of manufacturing a switchable shunt for an integrated lead suspension or component of the type formed from a laminated sheet of material including a conductive lead layer and a spring metal layer separated by an insulating layer, the method including providing the laminated sheet of material having the conductive lead layer and the spring metal layer separated by the insulating layer:
forming a contact base region on a portion of the spring metal layer;

forming at least one contact pad region formed in at least the conductive lead layer formed on the integrated lead suspension or component; and resiliently biasing the contact base region and the at least one contact pad region towards each other in a shunted state during which the contact pad region is in electrical contact with the contact base region, and movable from the shunted state to an electrically open state during which the contact pad region is electrically isolated from the contact base region.

26. The method of claim 25 including forming a contact arm which carries the at least one contact pad region.

27. The method of claim 25 including forming each contact pad region to include a portion of the insulating layer.

28. The method of claim 25 including forming each contact pad region to include a portion of the spring metal layer.

29. The method of claim 25 including forming one or more side arms between the contact base region and the contact arm, wherein each arm has a form for causing overlap between the contact pad regions and the contact base region.

30. The method of claim 25 including forming a plurality of contact arms on a common spring metal layer portion.

31. The method of claim 25 including etching the shunt from the laminated sheet of material.

32. The method of claim 25 including
forming a contact arm and an associated gap in the shunt; and pushing the contact arm through the gap to place the shunt in the shunted state.

33. A method of manufacturing a switchable shunt for an integrated lead suspension of the type having a conductive lead layer and a spring metal layer separated by an insulating layer, the method comprising providing a laminated sheet of material having the conductive lead layer and the spring metal layer separated by the insulating layer:

forming a contact base on the spring metal layer portion;

forming a contact pad region on the conductive lead layer formed on the integrated lead suspension;

forming a gap through the conductive lead layer, the insulating layer and the spring metal layer; and resiliently biasing the contact base and the contact pad region towards each other, making contact with each other in a shunted state in which the lead layer is in electrical contact with the metal spring layer, and wherein the contact base and the contact pad region are movable away from each other to break the contact between the lead layer and the spring metal layer in an electrically open state.

* * * * *